US006868096B1

(12) United States Patent
Hayashi

(10) Patent No.: US 6,868,096 B1
(45) Date of Patent: Mar. 15, 2005

(54) DATA MULTIPLEXING APPARATUS HAVING SINGLE EXTERNAL MEMORY

(75) Inventor: Naoya Hayashi, Tokyo (JP)

(73) Assignee: NEC Electronics Corporation, Kawasaki (JP)

( * ) Notice: Subject to any disclaimer, the term of this patent is extended or adjusted under 35 U.S.C. 154(b) by 0 days.

(21) Appl. No.: 09/158,002

(22) Filed: Sep. 22, 1998

(30) Foreign Application Priority Data

Sep. 22, 1997 (JP) ............................................. 9-256627

(51) Int. Cl.[7] ............................................... H04J 3/04
(52) U.S. Cl. ...................................... 370/535; 370/421
(58) Field of Search ................................ 370/532, 533, 370/534, 535, 537, 538–540, 428, 464, 474; 348/423.1; 710/29, 30, 36, 45, 52, 117, 124; 375/240

(56) References Cited

U.S. PATENT DOCUMENTS

| RE35,104 E | * | 11/1995 | Murakami et al. ............. 370/84 |
| 5,521,927 A | * | 5/1996 | Kim et al. ................. 370/94.2 |
| 5,561,466 A | * | 10/1996 | Kiriyama .................... 348/423 |
| 5,621,840 A | * | 4/1997 | Kawamura et al. ........... 386/68 |
| 5,751,356 A | * | 5/1998 | Suzuki ....................... 348/390 |
| 5,768,466 A | * | 6/1998 | Kawamura et al. ........... 386/68 |
| 5,898,695 A | * | 4/1999 | Fujii et al. .................. 370/464 |
| 5,920,572 A | * | 7/1999 | Washington et al. ........ 370/535 |
| 5,986,711 A | * | 11/1999 | Pau ............................ 348/408 |
| 6,141,385 A | * | 10/2000 | Yamaji ................... 375/240.27 |
| 6,151,441 A | * | 11/2000 | Kawamura et al. ........... 386/95 |
| 6,157,674 A | * | 12/2000 | Oda et al. ................... 375/240 |
| 6,369,855 B1 | * | 4/2002 | Chauvel et al. .......... 348/423.1 |

FOREIGN PATENT DOCUMENTS

| JP | 5-101118 | 4/1993 |
| JP | 8-32621 | 2/1996 |
| JP | 9-162829 | 6/1997 |
| JP | 09-162830 | 6/1997 |
| JP | 09-307520 | 11/1997 |
| JP | 10-21167 | 1/1998 |
| JP | 10-55614 | 2/1998 |
| JP | 10-174071 | 6/1998 |
| JP | 10-312633 | 11/1998 |

OTHER PUBLICATIONS

Japanese Translation of the Korean Office Action dated Dec. 12, 2001 with partial English Translation.

* cited by examiner

Primary Examiner—Alpus H. Hsu
Assistant Examiner—Toan D. Nguyen
(74) Attorney, Agent, or Firm—McGinn & Gibb, PLLC

(57) ABSTRACT

In a data multiplexing apparatus, a single external memory stores different kinds of transfer data. A header cache memory stores the system header and the header data, and a plurality of data cache memories stores the transfer data. The cache memories are connected via an internal bus to the external memory. A data input circuit sequentially fetches the transfer data from the external memory on a time division basis, so that the transfer data is stored in one of the data cache memories. Also, a system clock signal generation circuit constantly generates a system clock signal indicating the current time. A selector circuit sequentially selects the cache memories and generates a system stream formed by the system header, the header data and the transfer data. In this case, the selector circuit further selects the system clock generation circuit to input the system clock signal to a predetermined position of the system header.

24 Claims, 14 Drawing Sheets

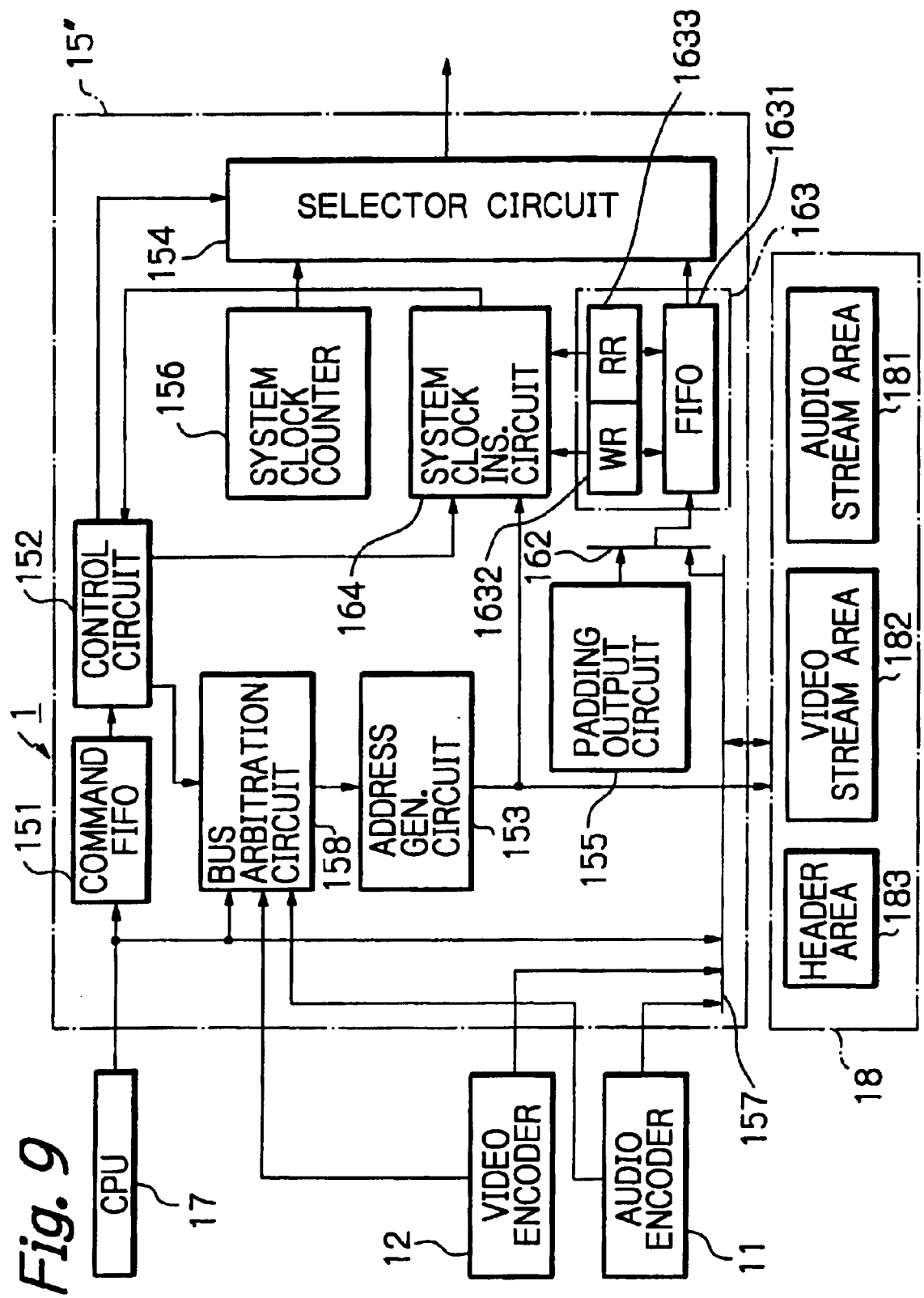

US 6,868,096 B1

DATA MULTIPLEXING APPARATUS HAVING SINGLE EXTERNAL MEMORY

BACKGROUND OF THE INVENTION

1. Field of the Invention

The present invention relates to a data multiplexing apparatus for forming a system stream from an audio stream and a video stream.

2. Description of the Related Art

There are known data processing systems for transferring and storing various data that are adapted to multiplex an audio stream and a video stream into a system stream before they are transferred or stored.

Generally, a data processing system is constructed by an encoder unit and a decoder unit that are connected with each other by way of a communication network. The encoder unit generates an audio stream from audio input data and a video stream from video input data, and then multiplexes them into a system stream and transmits it. The decoder unit receives the system stream and demultiplexes it to the audio stream and the video stream and then reproduces audio output data and video output data.

Also, the encoder unit is constructed by an audio encoder that produces an audio stream and a video encoder that produces a video stream. They are connected respectively to an audio stream first-in first-out (FIFO) memory and a video stream FIFO memory which are commonly connected to a single multiplexer. Further, the multiplexer is connected to a header FIFO memory as part of an external memory.

The multiplexer includes an address generation circuit and a selector circuit. The address generation circuit is connected to the above-mentioned three FIFO memories, which are in turn connected to the selector circuit. The selector circuit is also connected to a system clock counter.

Thus, the encoder unit can convert an audio stream and a video stream into a system stream, and transfer it to the decoder unit. Also, the encoder unit can insert a system clock signal showing the current time into the system stream, so that the decoder unit can reproduce the audio stream and the video stream at respective appropriate timings. This will be explained later in detail.

However, the encoder unit stores the audio stream and the video stream and various headers respectively in a plurality of the external FIFO memories. Therefore, a complex interface is required between the encoder unit and each of the FIFO memories which increases the size of the encoder unit and hinders the attempt to realize a down-sized encoder unit with and improved productivity.

SUMMARY OF THE INVENTION

It is an object of the present invention to provide a data multiplexing apparatus used in a data processing system, capable of having a simple interface.

According to the present invention, in a data multiplexing apparatus, a single external memory stores different kinds of transfer data such as an audio stream a video stream. A header cache memory stores a system header and header data for audio packets and video packets, and a plurality of data cache memories store the transfer data. The header cache is connected to a central processing unit (CPU) that generates the system header and the header data. The cache memories are connected via an internal bus to the external memory. A data input circuit sequentially fetches the transfer data from the external memory on a time division basis, so that the transfer data is stored in one of the data storing circuits. Also, a system clock signal generation circuit constantly generates a system clock signal indicating the current time. A selector circuit sequentially selects the cache memories, reads a predetermined length of data from them, and generates a system stream formed by the audio stream, the video stream and other header data. In this case, the selector circuit further selects the system clock generation circuit to input the system clock signal to a predetermined position of the system header.

In another aspect of the present invention, in a data multiplexing apparatus, a single external memory is connected to an internal bus and stores a system header, different kinds of header data and different kinds of transfer data. A data input circuit reads those data from the external memory multiplex the system header, the header data and the transfer data, produces the system stream, and stores a system stream in the system stream storing circuit. Also, a system clock signal generation circuit constantly generates a system clock signal indicating current time, and a system clock insertion circuit generates a timing signal for inserting the system clock signal into the system header of the system stream. A selector circuit is connected to the system stream storing circuit and the system clock signal generation circuit. When the system clock insertion circuit does not generate the timing signal, the selector circuit selects the system stream storing circuit. When the system clock insertion circuit generates the timing signal, the selector circuit selects the system clock signal generation circuit.

BRIEF DESCRIPTION OF THE DRAWINGS

The present invention will be more clearly understood from the description set forth below, as compared with the prior art, with reference to the accompanying drawings, wherein:

FIG. 9 is a block circuit diagram illustrating a second embodiment of the encoder unit according to the present invention;

DESCRIPTION OF THE PREFERRED EMBODIMENTS

Before the description of the preferred embodiments, a prior art data multiplexing apparatus will be explained with reference to FIGS. 1, 2, 3, 4, 5 and 6.

Figure 1:
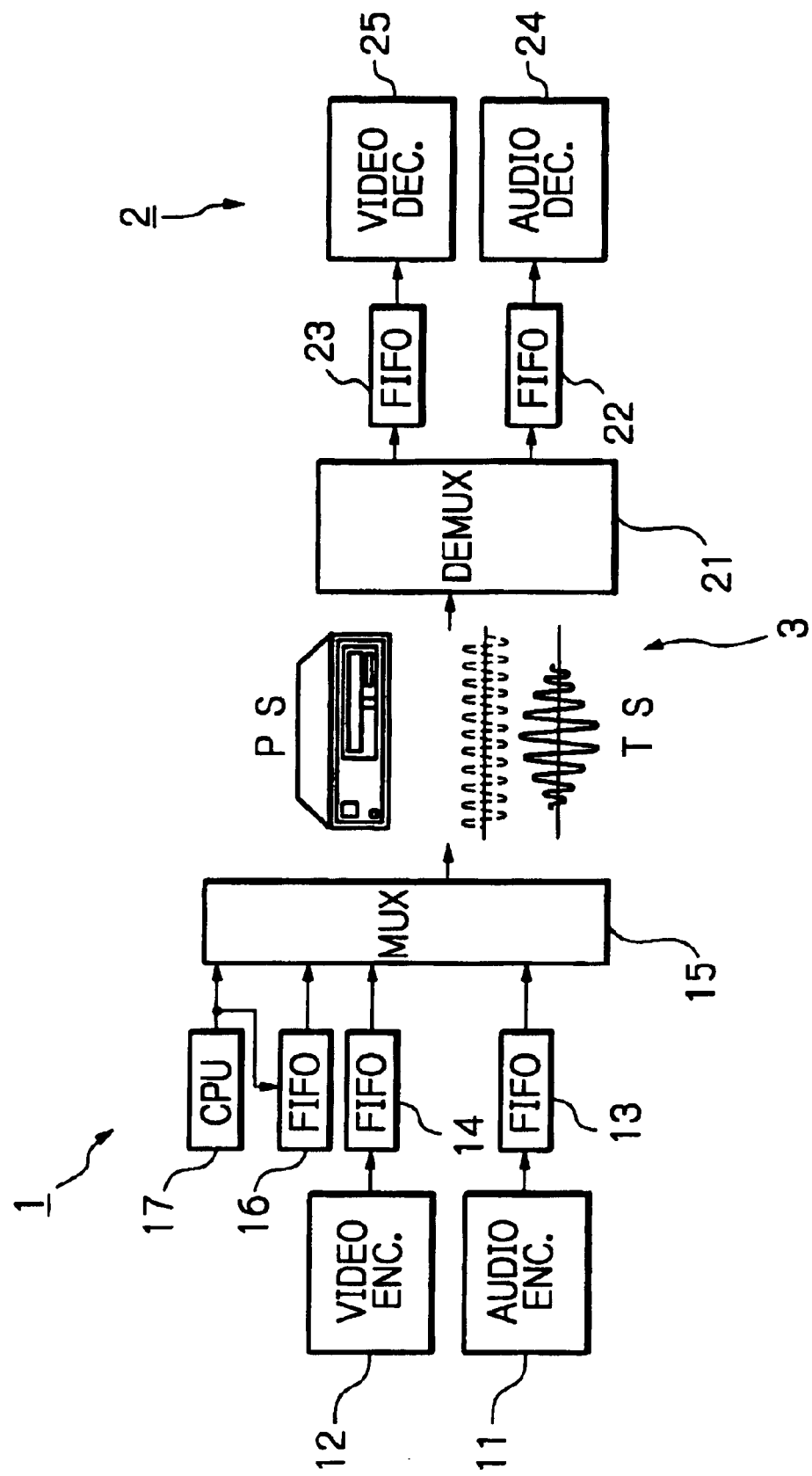
FIG. 1 is a block circuit diagram illustrating a prior art data processing system.

In FIG. 1, which illustrates a prior art data processing system, an encoder unit 1 and a decoder unit 2 are connected with each other by way of a communication network 3. The encoder unit 1 is designed to generate and transmit a system stream from audio input data and video input data, and the decoder unit 2 is designed to receive the system stream and reproduce audio output data and video output data.

While the encoder unit 1 and the decoder unit 2 are adapted to transmit the system stream on a real time basis by way of the communication network 3, the system may alternatively be so arranged that the encoder unit 1 temporarily stores the system stream in a storage medium (not shown) such as an optical disk, and the decoder unit 2 reproduces the system stream from the storage medium.

The encoder unit 1 is constructed by an audio encoder 11 and a video encoder 12, which are connected respectively to an audio stream first in first out (FIFO) memory 13 and a video stream FIFO memory 14 operating as so many buffers. The FIFO memories 13 and 14 are commonly connected to a single multiplexer 15, which is a data multiplexing apparatus connected to the communication network 3.

Also, the multiplexer 15 is connected to a header FIFO memory 16 as part of an external memory. The header FIFO memory 16 as well as the multiplexer 15 is connected to a central processing unit (CPU) 17.

On the other hand, the decoder unit 2 is constructed by a demultiplexer 21 connected to the communication network 3. The demultiplexer 21 is also connected to an audio stream FIFO memory 22 and a video stream FIFO memory 23 operating as respective buffers, which are connected to an audio decoder 24 and a video decoder 25, respectively.

Figure 2:
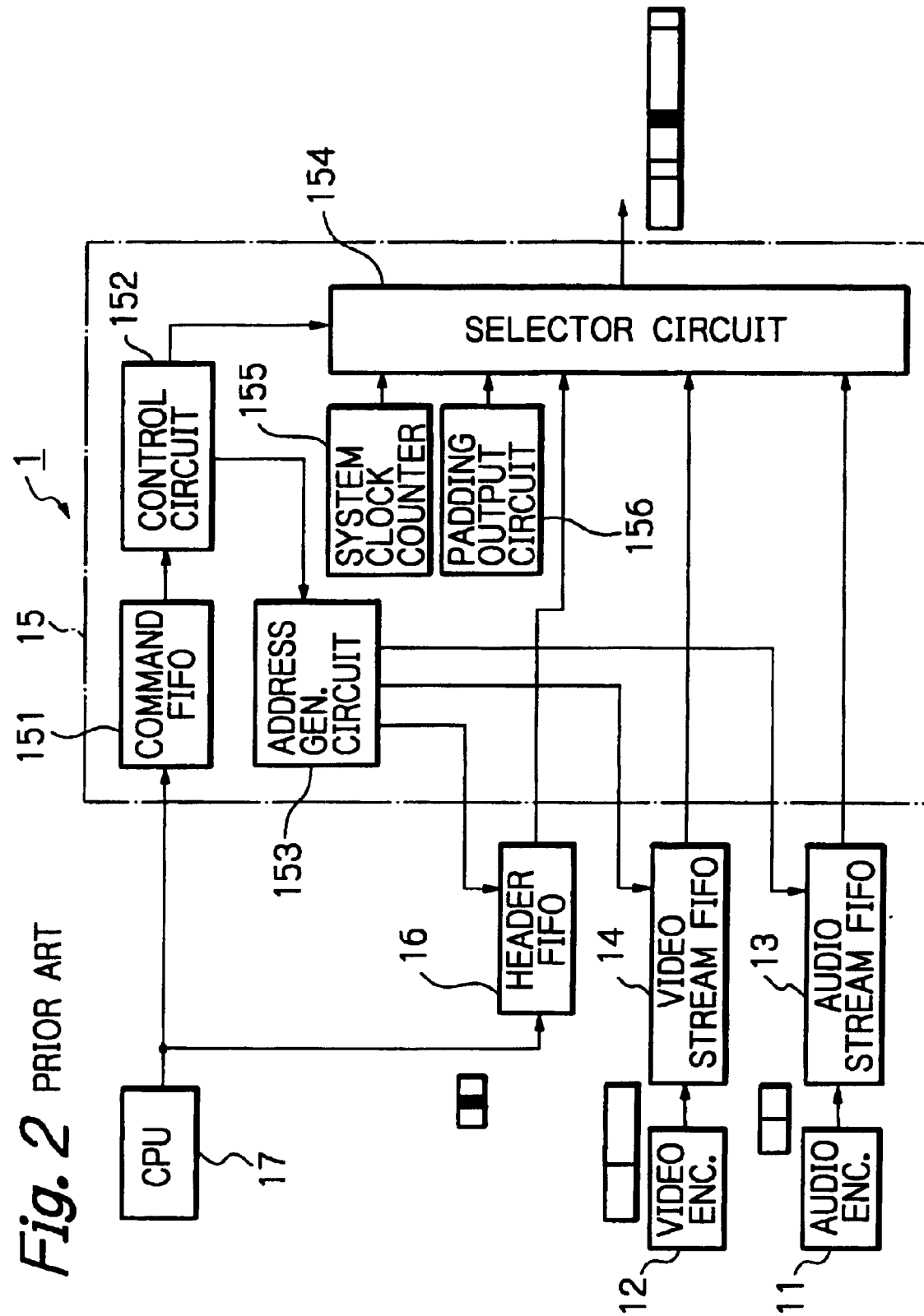
FIG. 2 is a block circuit diagram of the encoder unit of FIG. 1.

In FIG. 2, which is a detailed block circuit diagram of the multiplexer 15 of FIG. 1, the multiplexer 15 is provided with a command FIFO memory 151, which is connected to the CPU 17. The command FIFO memory 151 is also connected to a control circuit 152, which is in turn connected to an address generation circuit 153 and a selector circuit 154.

The address generation circuit 153 is connected to the three FIFO memories 13, 14 and 16, which are in turn connected to the selector circuit 154. The selector circuit 154 is connected to a system clock counter 155 and a padding output circuit 156 and also to the communication network 3.

The volume of an audio stream stored in the audio stream FIFO memory 13 and the volume of a video stream stored in the video stream FIFO memory 14 may change with time, because the streams are temporarily stored and read on a real time basis. However, the CPU 17 can recognize the volume of data stored in the FIFO memories 13 and 14 because they are connected to the CPU 17 by connections (not shown).

Figure 3:
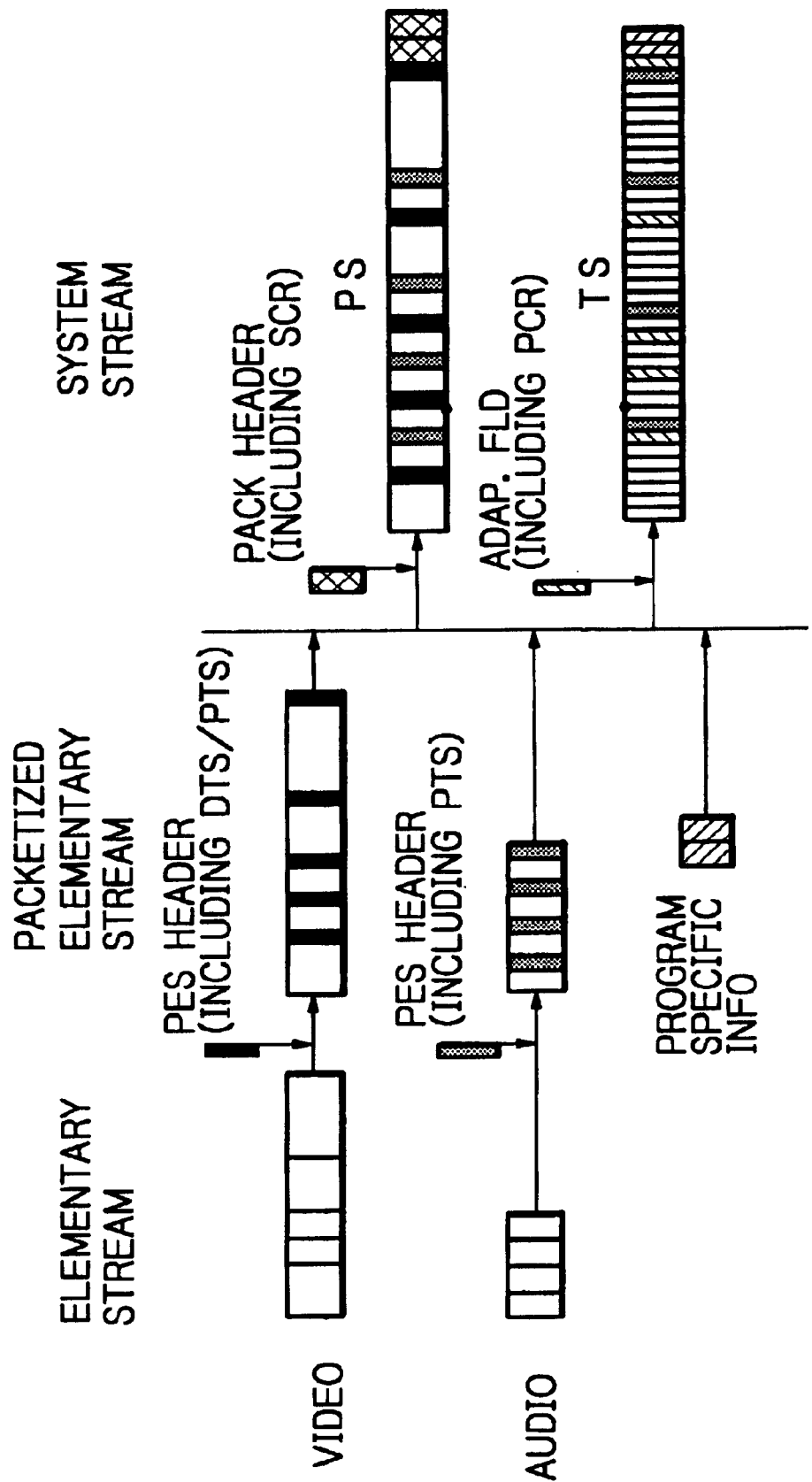
FIG. 3 is a diagram for explaining generation of a system stream from audio and video streams in the encoder unit of FIG. 2.

FIG. 3 is a diagram for explaining generation of a system stream from audio and video streams in the encoder unit 1 of FIG. 2, input data and video input data that are synchronized with each other are compressed by means of the audio encoder 11 and the video encoder 12 using the method specified by the moving picture experts group (MPEG) system and are converted into the audio stream and the video stream. Then, the encoder unit 1 multiplexes these streams stored temporarily in the audio stream FIFO memory 13 and the video stream FIFO memory 14 into a system stream having a form of program streams (PS) or transport stream (TS) before sending it out as data. Upon receiving the system stream as data, the decoder unit 2 demultiplexes the audio stream and the video stream, and then decodes them to reproduce audio output data and video output data.

With the MPEG system, the encoder unit 1 and the decoder unit 2 are provided with respective system clocks in order to ensure a synchronized state with each other. Thus, as the encoder unit 1 inserts as data the current value of its own system clock signal into the system stream from time to time, the decoder unit 2 adjusts, whenever necessary, the current value of its own system clock signal by referring to system clock signal in the received system to ensure a synchronized state for the encoder unit 1 and the decoder unit 2.

Moreover, the encoder unit 1 specifies a decoding time stamp (DTS) and a presentation time stamp (PTS) for decoding and reproducing the video unit data (e.g., a frame) contained in each packet of the video stream, respectively, and a PTS for decoding and reproducing the audio unit data (e.g., a predetermined time period) contained in each packet of the audio stream and inserts them as data into the video header and audio header by means of a value of the system clock signal.

When the system clock signal of the decoder unit 2 coincides with the DTS of the received packet of the video stream, the video decoder 25 in the decoder unit 2 decodes the video unit data in the packet and generates video output data. Then when the system clock signal of the decoder unit 2 coincides with the PTS of the received packet, the video decoder 25 reproduces video output data. Similarly, when the system clock signal of the decoder unit 2 coincides with the PTS of the received packet of the audio stream, the audio decoder 24 in the decoder unit 2 decodes the audio unit data in the packet and generates audio output data, then reproduces the audio output data. It is possible that some video packets do not have their DTS/PTS in their header. Then, the decoding/reproducing timing is determined by adding a constant (i.e., a frame period) to the DTS/PTS of the last video packet. Also, the decoding and reproducing timing of the audio packet that do not have its PTS is determined by adding a constant (i.e., the predetermined timing period of the audio encoder) to the PTS of the last audio packet. For the purpose of simplification, every audio and video packet is assumed to have its PTS/DTS and PTS in its header.

The representation time when the video data or the audio data of the current encoding operation unit are reproduced by the decoder unit 2 can be determined by adding a constant to the representation time when the last video data or the last audio data, whichever appropriate, were reproduced because each encoding operation unit contains data corresponding to a fixed time period.

A value of the system clock signal is input to a predetermined position of a system header in the case of the PS system and to a predetermined position of an adaptation field corresponding to a system header in the case of the TS system. The DTS and PTS of video data in video packets and the PTS of audio data in audio packets are input to respective predetermined positions of the video header and the audio header correspondingly.

In order to maintain a synchronized state for the encoder unit 1 and the decoder unit 2, the delay time of the communication network 3 or the storage medium interposed therebetween is preferably always constant. Thus, the value of the system clock signal input as data to the system stream by the encoder unit 1 needs to be equal to the value of the system clock signal at the time when the encoder unit 1 outputs the position of the system clock signal in the system header.

Figure 4:
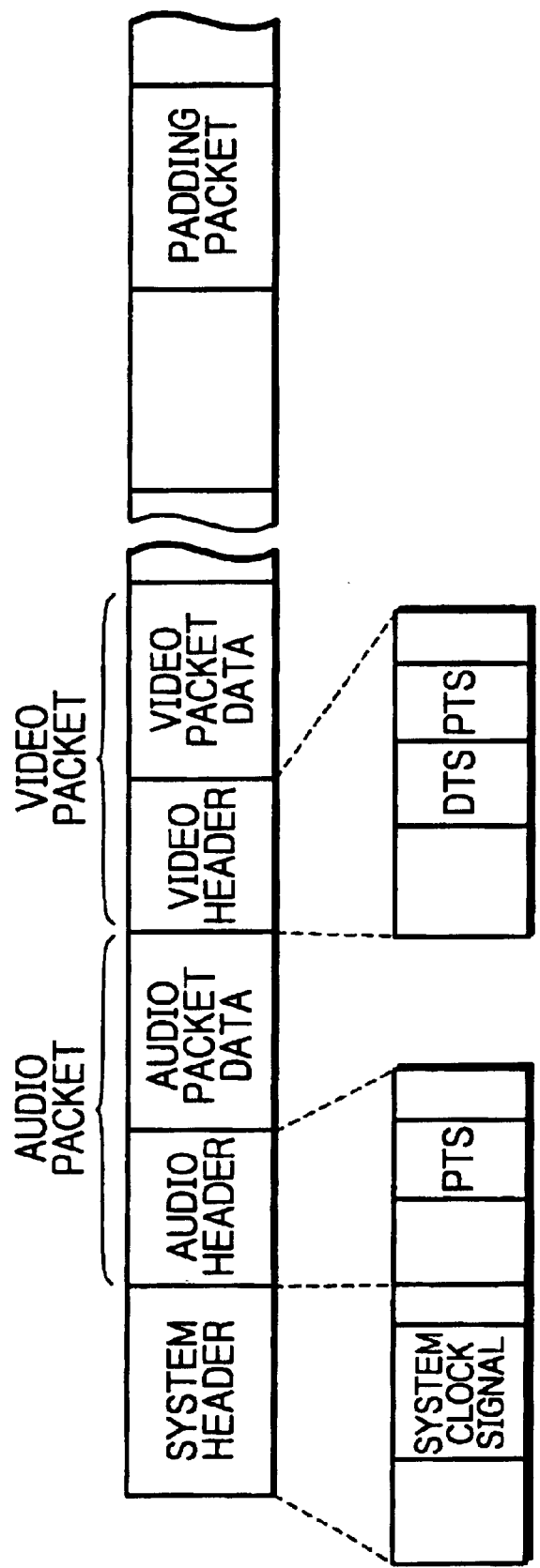
FIG. 4 is a format diagram of a system stream of FIG. 3.

In the case of the data processing system of FIG. 1, if a system stream generated by the encoder unit 1 is assumed to be corresponding to the PS that has a simple structure for the purpose of simplification, as shown in FIG. 4, a system stream is formed by a plurality of pack data, each including a plurality of packets. Each video packet is headed by a video header, and each audio packet is headed by an audio header, and each pack data is headed by a system header.

Note that in each of the plurality of pack data, the first data packet following the system header is an audio packet, which is then followed by a predetermined number of consecutive video packets, the number of which corresponds to the volume of data stored at the time of generation to the system stream. Note also that, each cache pack has a predetermined length and if the volume of data stored is not sufficient, one or more padding packets will be inserted as dummy packets instead of audio packets and video packets. This arrangement is used for the purpose of simplication, and can be applied to PS and TS.

The data multiplexing method used by the encoder unit 1 to generate a system stream will be explained next.

When the audio encoder 11 sequentially generates an audio stream from audio input data, the generated audio stream is stored also sequentially in the audio stream FIFO memory 13, which is an external memory. Similarly, as the video encoder 12 sequentially generates a video stream from video input data, the generated video stream is stored also sequentially in the video stream FIFO memory 14, which is also an external memory.

Figure 5:
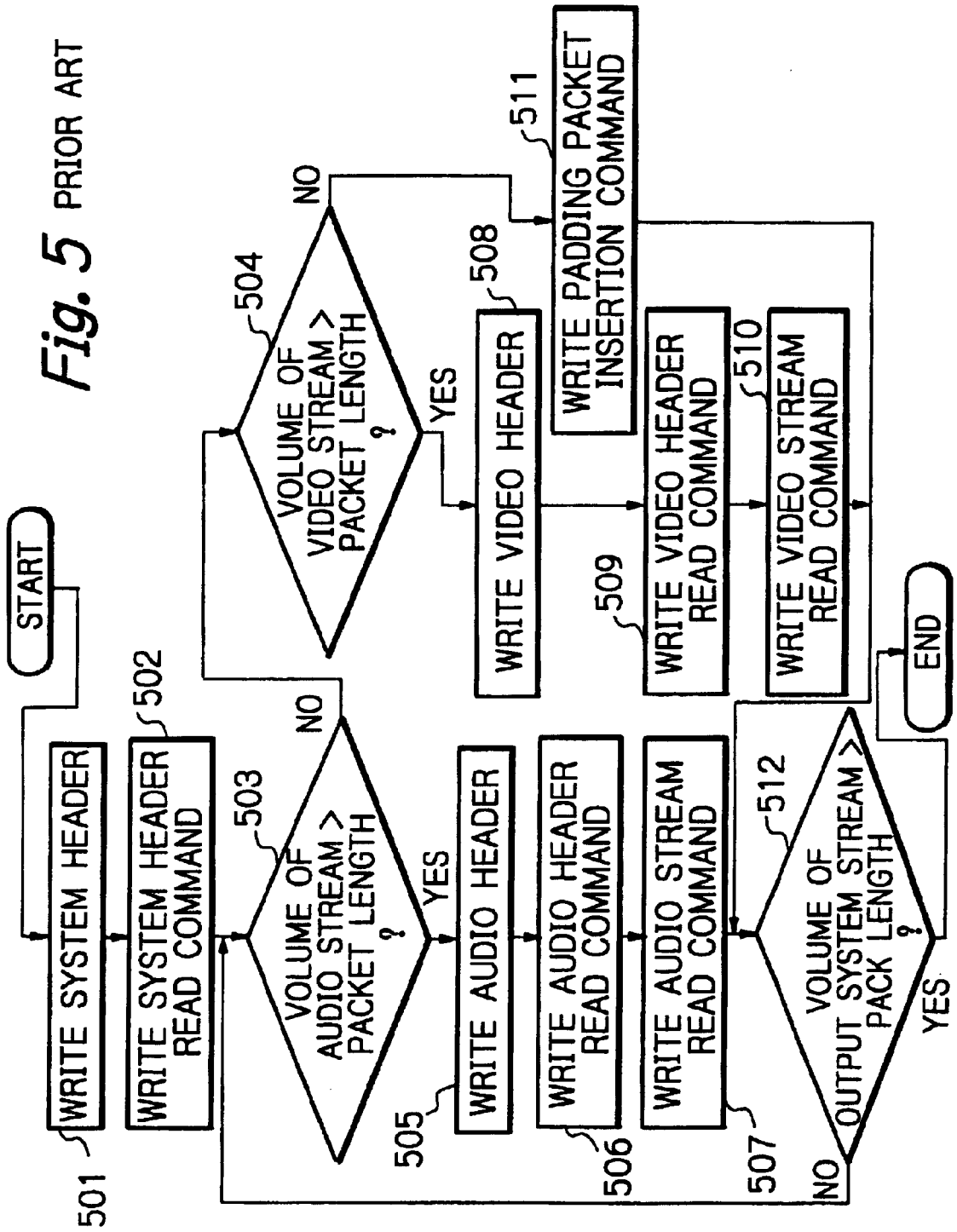
FIG. 5 is a flowchart showing the operation of the CPU of FIG. 2.

In the above-mentioned state, as shown in FIG. 5, the CPU 17 firstly generates a system header, an audio header including an appropriate PTS and a video header including an appropriate pair of DTS and PTS and stores them in the header FIFO memory 16 (see steps 501, 502, 503, 504, 505 508). Then, the CPU 17 issues header and stream read commands directed to the header FIFO memory 16, the audio stream FIFO memory 13 and the video stream FIFO memory 14 in the above described order as checking the volume of the audio stream in the audio stream FIFO 13 and that of the video stream in the video stream FIFO memory 14 and stores them in the command FIFO memory 151 (see steps 506, 507, 509, 510). Note that, if the volume of an audio stream stored in the FIFO memory 13 is not larger than a predetermined packet length and the volume of the video stream stored in the FIFO memory 14 is not larger than the predetermined packet length, the control proceeds from step 501 via step 502, 503, 504 to steps 511, 512, 513. In this case, the CPU 17 writes a padding packet insertion command in the command FIFO memory 15. Note that, if the volume of an output system stream is not larger than one packet length, the control returns to step 503.

Figure 6:
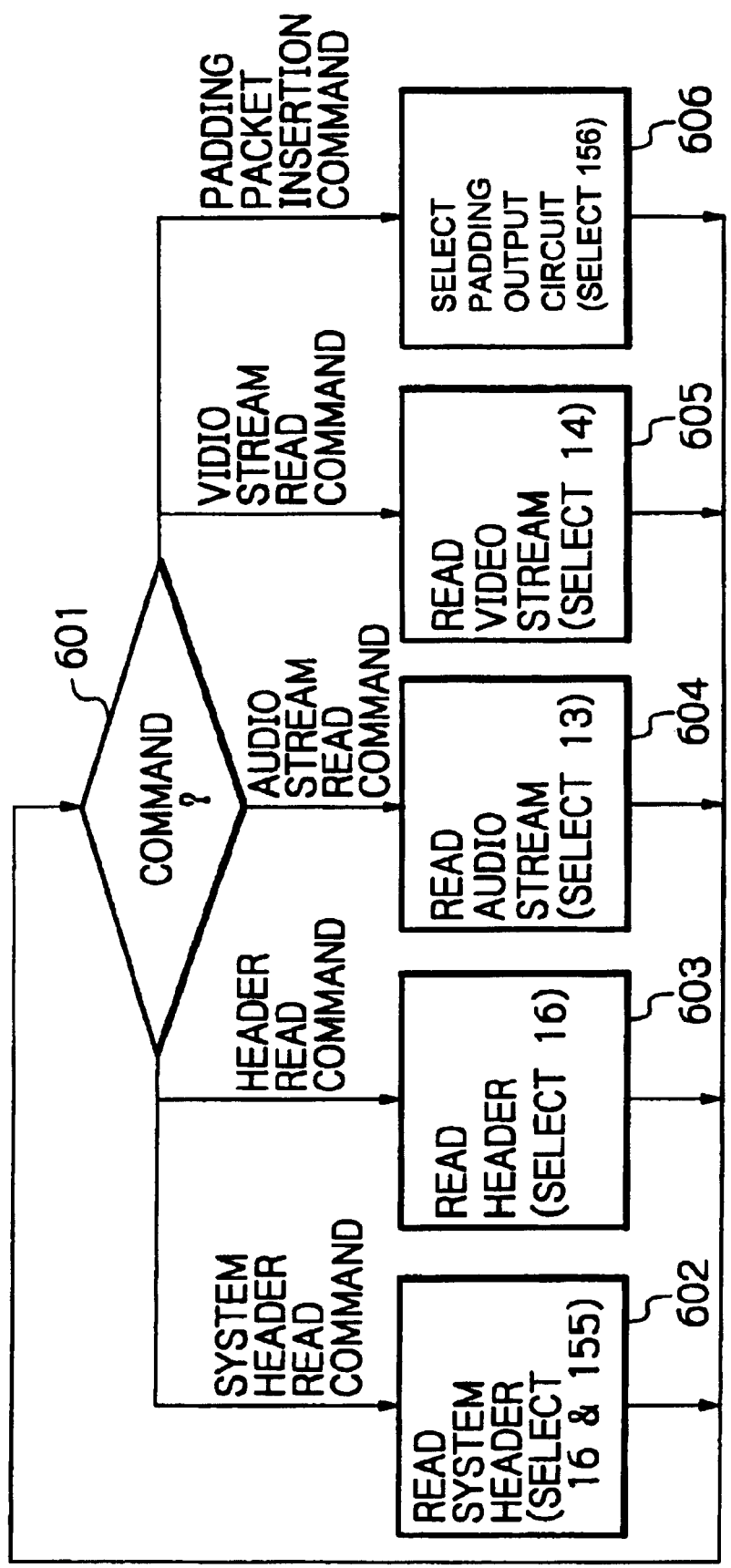
FIG. 6 is a flowchart showing the operation of the control circuit of FIG. 2.

The various commands stored in the command FIFO memory 151 as described above are then sequentially read and determined by the control circuit 152 as shown by step 601 in FIG. 6, and as a result, a system stream is generated as the control circuit 152 controls the address generation circuit 153 and the selector circuit 154 in response to the commands.

In FIG. 6, at step 601, it is determined whether a command fetched from the command FIFO memory 151 is a system header read command, a header read command for an audio header or a video header, an audio stream read command, a video stream read command or a padding packet insertion command.

If the fetched command is a system header read command, the control at step 601 proceeds to step 602 which controls the address generation circuit 153, As a result, an appropriate address is generated and transmitted to the header FIFO memory 16, so that a system header is read from the header FIFO memory 16. In this case, the control circuit 152 controls the selector circuit 154 to select the header FIFO memory 16. Therefore, the read system header is output from the multiplexer 15. Under this condition, a system clock signal is externally output in the course of outputting the system header as the selector circuit 154 switches from the header FIFO memory 16 to the system clock counter 155 at an appropriate timing so that consequently the system clock signal is inserted into a predetermined position of the system header that is externally output.

If the fetched command is a header read command, for an audio header or a video header, the control at step 601 proceeds to step 603 which controls the address generation circuit 153. As a result, an appropriate address is generated and transmitted to the header FIFO memory 16, so that the corresponding header is read from the header FIFO memory 16. In this Case, the control circuit 152 controls the selector circuit 154 to select the header FIFO memory 16. Therefore, the read header is output from the multiplexer 15.

If the fetched command is an audio stream read command, the control at step 601 proceeds to step 604 which controls the address generation circuit 153. As a result, an appropriate address is generated and transmitted to the audio stream FIFO memory 13, so that an audio packet data is read from the audio stream FIFO memory 13. In this case, the control circuit 152 controls the selector circuit 154 to select the audio stream FIFO memory 13. Therefore, the read audio packet data is output from the multiplexer 15.

If the fetched command is a video stream read command, the control at step 601 proceeds to step 605 which controls the address generation circuit 153. As a result, an appropriate address is generated and transmitted to the video stream FIFO memory 14, so that a video packet is read from the video stream FIFO memory 14. In this case, the control circuit 152 controls the selector circuit 154 to select the video stream FIFO memory 14. Therefore, the read video packet data is output from the multiplexer 15.

If the fetched command is a padding packet insertion command, the control at step 601 proceeds to step 606 which controls the selector circuit 154 to select the padding output circuit 156. Therefore, a padding packet is output from the multiplexer 15.

Thus, video packets and audio packets are read and externally output appropriately. If the volume of data stored in one of the FIFO memories 13 and 14 is short of the packet length, packet data are read from the other memory. If the volume of data stored in both of the FIFO memories 13 and 14 is short of the packet length, a padding packet is output from the padding output circuit 156.

As described above, since the system stream output from the encoder unit 1 contains a system clock signal showing the current time in its system header, the decoder unit 2 externally receiving the system stream can synchronize its own system clock signal, and hence can decode and produce the audio packets and the video packets of the system stream respectively at the accurate timings.

In other words, with the data processing system of FIG. 1, the system clock signal showing the current time is inserted into the system stream to be externally output generated by the encoder unit 1, and the representation time for reproducing each of the audio packet and the video packet is specified by its header. Thus, the decoder unit 2 can sequentially reproduce audio output data and video output data from the system stream on a real time basis in synchronization with the operation of the encoder unit 1.

However, with the data processing system of FIG. 1, the encoder unit 1 stores the audio stream and the video stream and various headers respectively in a plurality of the external FIFO memories, i.e., the audio stream FIFO memory 13, the video stream FIFO memory 14 and the header FIFO memory 16. Therefore, a complex interface is required between the encoder unit 1 and each of the FIFO memories 13, 14 and 16 which increases the size of the encoder unit 1 and hinders the attempt to realize a down-sized encoder unit with an improved productivity.

For example, it may be possible to put the FIFO memories 13, 14 and 16 together into a single external memory that includes three different memory areas acting as the FIFO memories 13, 14 and 16. Then, the encoder unit 1 requires only a single interface for connecting itself with a single external memory for storing audio data, video data and various headers.

However, with such an arrangement, requests for writing various data into and reading various data from the single external memory may arise at various different timings. As a result, a data reading operation may have to be held to a stand-by state for a long period in order to execute a data writing operation which would consequently obstruct the attempt to read audio data and video data smoothly without delay. In this case, there may arise instances where audio data and video data are transmitted belatedly and arrive at the decoder unit 2 behind the time for reproducing them and/or padding packets are externally output frequently which reduces the overall data transfer rate.

Figure 7:
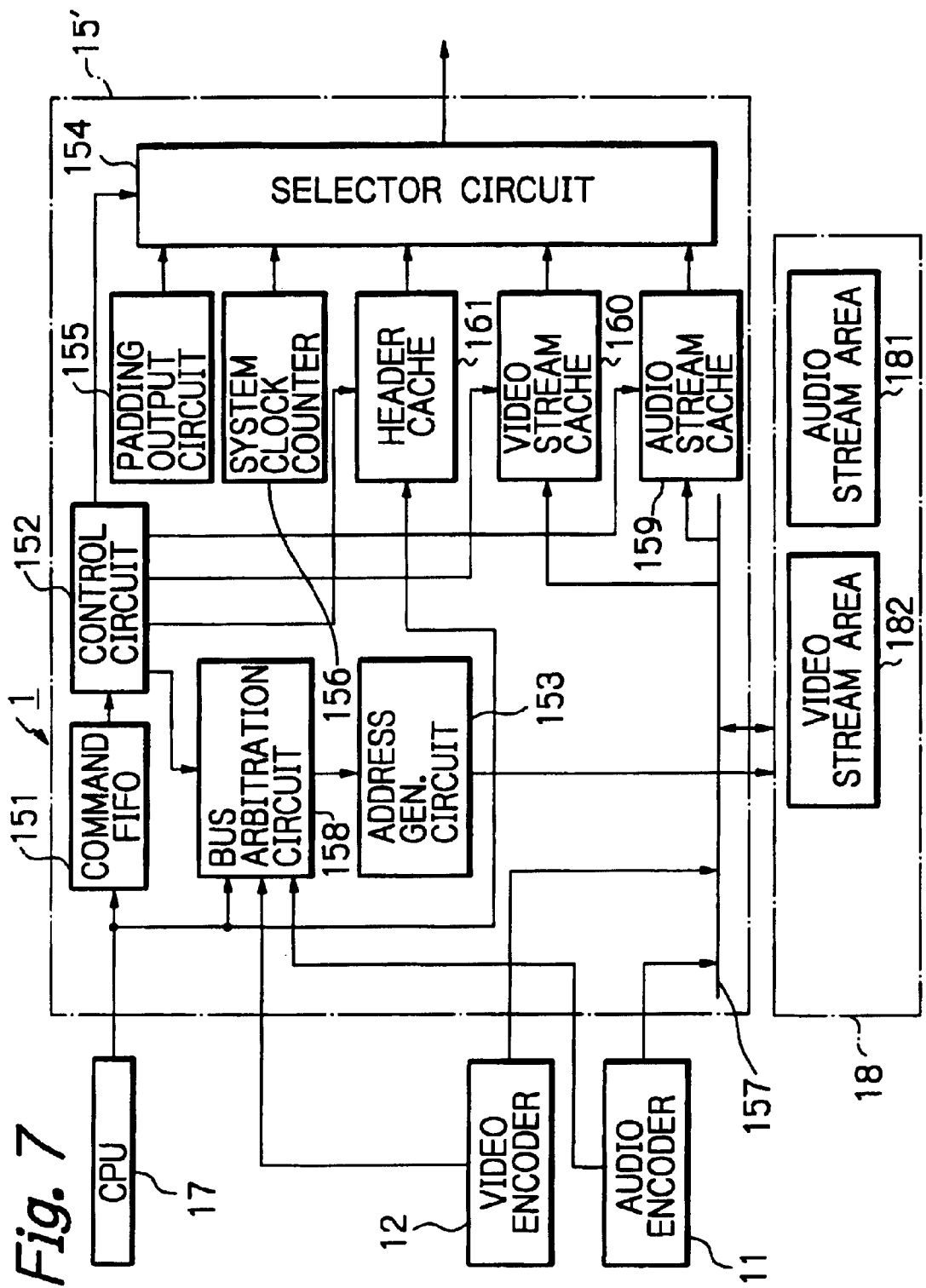
FIG. 7 is a block circuit diagram illustrating a first embodiment of the encoder unit according to the present invention.

In FIG. 7, which illustrates a first embodiment of the encoder unit according to the present invention, the multiplexer 15 of FIG. 2 is modified into a multiplexer 15', and an external memory memory 18 is connected to the multiplexer 15'.

The external memory 18 has an audio stream area 181 and a video stream area 182. The audio stream area 181 temporarily stores an audio stream generated by the audio encoder 11, and the video stream area 182 temporarily stores a video stream generated by the video encoder 12.

The multiplexer 15' includes an internal bus 157 which connects the audio encoder 11 and the video encoder 12 to the external memory 18.

Also, the multiplexer 15' includes a bus arbitration circuit 158 which is connected to the control circuit 152, the address generation circuit 153, the audio encoder 11, the video encoder 12 and the CPU 17.

The bus arbitration circuit 158 arbitrates various demands of the control circuit 152, the audio encoder 11, the video encoder 12 and the CPU 17 for accessing the internal bus 157 for data transmission. The address generation circuit 153 generates address data for reading data from and writing data in the external memory 18 under the control of the bus arbitration circuit 158.

Further, the multiplexer 15' includes an audio stream cache memory 159, a video stream cache memory 160 and a header cache memory 161 which are controlled by the control circuit 152.

The external memory 18 is connected in parallel to the cache memories 159 and 160 by way of the internal bus 157, and the cache memories 159, 160 and 161 are commonly connected to the selector circuit 154.

For example, the control circuit 152 controls the address generation circuit 153 by way of the bus arbitration circuit 158 and controls the cache memories 159, 160 and 161 in response to a predetermined command fetched from the command FIFO memory 151. The CPU 17 issues commands to sequentially read a system header, a plurality of different kinds of transfer data stored in the cache memories 159, 160 and 161, respectively, on a time division basis. Thus, a data input means is realized by the above arrangement.

Similarly, the control circuit 152 controls the cache memories 159, 160 and 161 and the selector circuit 154 in response to the fetched command to read a system header, an audio header, a video header, audio packet data and video packet data from the cache memories 159, 160 and 163, and multiplex them in a single system stream, which is externally output from the selector circuit 154. Thus, a stream generating means and an output means for external output are realized by the above arrangement.

Additionally, when processing the system header read command, the control circuit 152 controls the selector circuit 154 so as to switch the provider of the output data at a predetermined timing from the header cache memory 161 to the system clock counter 156 and insert the system clock signal of the current time into a predetermined position of the system header of the system stream. Thus, a clock input means is realized by the above arrangement.

With the data processing system of FIG. 1, where the encoder unit of FIG. 7 is provided instead of the encoder unit of FIG. 2, audio data and video data that are synchronized with each other are compressed and multiplexed to a single system stream in the form of PS or TS before they are transmitted. The system stream is then received by the corresponding decoder limit 2, which reproduces the audio and video output data.

Under the above-mentioned condition, the CPU 17 firstly generates a system header and stores it in the header cache memory 161. Thereafter, the CPU 17 operates as shown in FIG. 8, which is similar to that of the prior art shown in FIG. 5. The difference is that the CPU of this embodiment checks the volume of the audio stream in the audio stream cache memory 159 and the volume of the video stream in the video stream cache memory 160 when it determines whether or not to generate an audio packet or a video packet respectively. also, the CPU 17 of this embodiment writes those headers in the header cache memory 161.

The commands stored in the command FIFO memory 151 are then sequentially read by the control circuit 152 to control each of the cache memories 160, 161 and 159 and the address generation circuit 153 by way of the bus arbitration circuit 158.

Figure 8A:
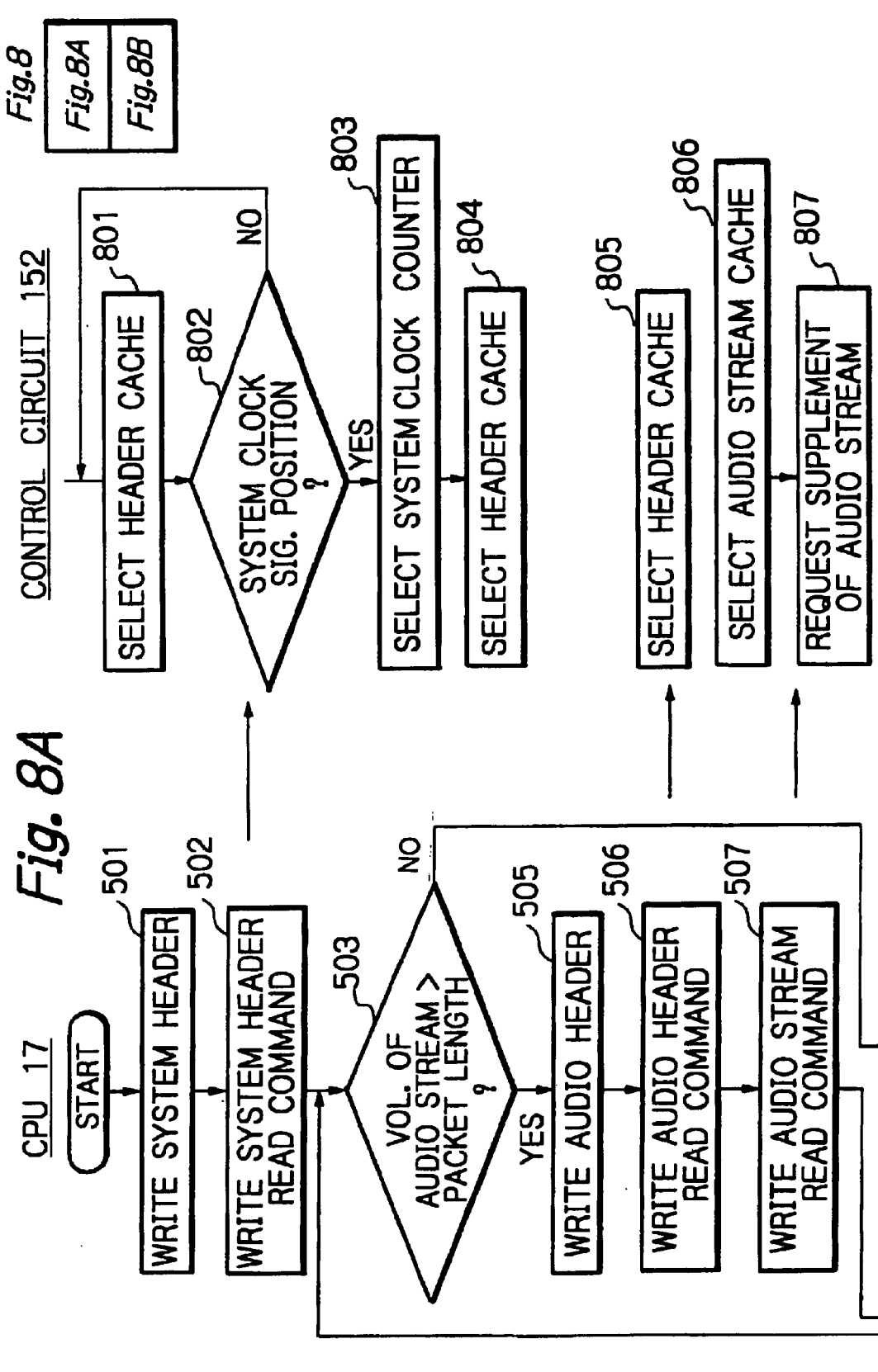
FIGS. 8A and 8B are flowcharts for explaining the operation of the control circuit of FIG. 7.
Figure 8B:
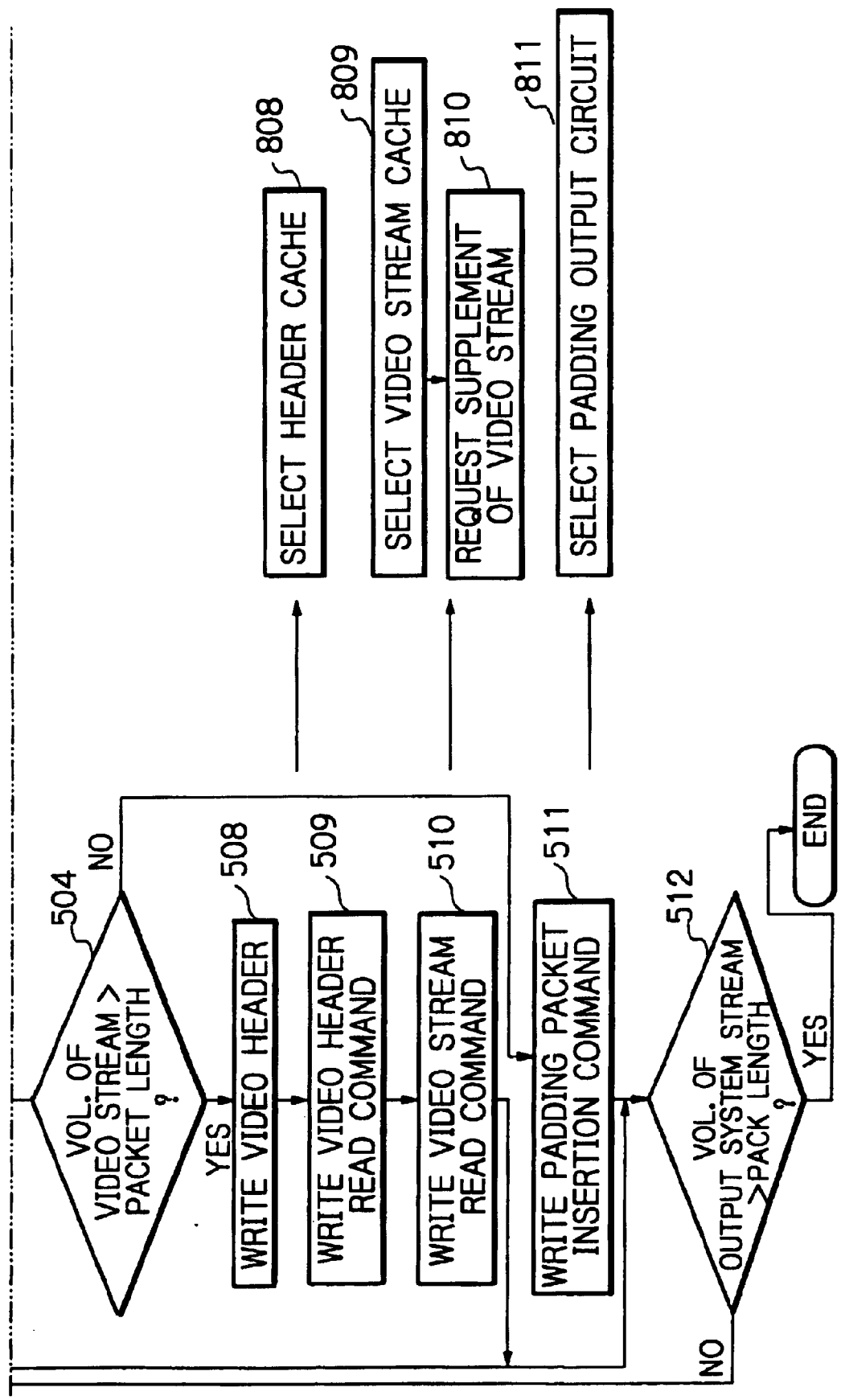

The operation of the control circuit 152 is explained next with reference to FIGS. 8A and 8B.

First, at step 801, in response to the system header read command, the control circuit 152 controls the selector circuit 154, so that the selector circuit 154 selects the header cache memory 161. As a result, a system header is output to the outside.

Next, at step 802, the control circuit 152 determines whether or not a predetermined timing position for inserting a system clock signal is established only when this predetermined timing position is established, does the control proceed to step 803. Otherwise, the control returns to step 801.

At step 803, the control circuit 152 controls the selector circuit 154 so as to switch from the header cache memory 161 to the system clock counter 156 and output as data the current system clock signal of the current time in the course of outputting the system header. Step 803 is repeated by step 804. As a result, the system clock signal is input to the predetermined timing position of the system header being externally output. Then, the selector circuit 154 selects the header cache 161, so that the rest of the system header is output.

At step 805, in response to the audio header read command, the control circuit 152 controls the selector 154 to select the header cache memory 161. As a result, an audio header is externally output.

Next, at step 806, in response to the audio stream read command, the control circuit 152 operates the selector circuit 154 to select the audio stream cache memory 159, so that the audio packet data is externally output.

At step 807, the control circuit 152 requests supplement of an audio packet data from the audio stream area 181 of the external memory 18 to the audio stream cache memory 159.

At step 808, in response to the video header read command, the control circuit 152 operates the selector circuit 154 to select the header cache memory 160, so that the video stream is externally output.

Next, at step 809, in response to the video header read command, the control circuit 152 operates the selector 154 to select the video cache memory 160, so that the video stream is externally output.

Next, at step 810, the control circuit 152 requests supplement of a video stream for the next packet from the video stream area 182 of the external memory 18 to the video stream cache memory 160.

On the other hand, if the padding packet read command is fetched, at step 811, the control circuit 152 operates the selector circuit 14 to select the padding output circuit 155. As a result, a padding packet is externally output.

The above-mentioned operation is repeated until a final command to construct a pack is processed.

The address generation circuit 153 generates appropriate address data to write the audio stream to the audio stream area 181 from the audio encoder 11, to read the audio stream from the audio stream area 181 to the audio stream cache memory 159, to write the video stream to the video stream area 182 from the video encoder 12, and to read the video stream from the video stream area 182 to the video stream cache memory 160 under the control of the bus arbitration circuit 158.

As described above, the system stream externally output from the encoder unit 1 includes a system clock signal indicating the current time and inserted into the system header. Therefore, the decoder unit 2 of FIG. 1 for externally receiving the system stream can synchronize its own system clock signal and accurately recognize the decoding timing and the reproducing timing of the audio packets and the video packets.

The encoder unit 1 of FIG. 7 is provided only with the single external memory 18 for temporarily storing the audio stream and the video stream sequentially generated by the audio encoder 11 and the video encoder 12, respectively. Thus, only the single interface is required for the multiplexer 15' to access the external memory 18 and hence the multiplexer 15' can be down-sized and manufactured with an improved productivity.

When the single external memory 18 is provided and data are read from and written in to it on a real time basis, a data reading operation may have to be held to a stand-by state for a long period in order to execute a data writing operation. However, with the multiplexer 15', the various streams read from the external memory 18 are temporarily stored in the cache memories 159 and 160 before they are externally output in the form of a system stream, so that the risk of delaying the transmission of audio packets and video packets in a system stream behind the due time for decoding and reproducing by the decoder units and the risk of frequently outputting padding packets can be reduced to ensure an overall excellent transfer rate.

Note that, while the external memory 18 connected to the multiplexer 15' has a relatively large capacity for temporarily storing without overflowing various data that are being generated sequentially, the cache memories 159 and 160 built in the multiplexer 15' are made to have a minimum capacity that meets the requirement of temporarily storing various packets necessary for continuously generating system streams.

When one of the cache memories 159, 160 and 161 is externally outputting data it stores, the remaining two cache memories can sequentially and externally receive data from the external memory 18 or the CPU 17. Therefore, the cache memories 159 and 160 are required to have a capacity for storing at least an audio packet and a video packet, while the header cache memory 161 is required to have a capacity for storing at least a header of each of the various types.

Thus, while the multiplexer 15' of FIG. 7 needs to have three built-in cache memories to substantiate a significant increase in the number of memories if compared with the multiplexer 15 of FIG. 2, the increase in the circuit size attributable to them is quite small and the overall size of the encoder unit 1 can be remarkably reduced because it comprises only a single interface to reduce the number of wires and connectors.

The first embodiment can be altered and modified in various ways without departing from the spirit and the scope of the invention. For example, a system stream that can be used for the first embodiment includes various headers and data of a plurality of different types to be multiplexed, such a system stream can be used for transferring data of various other types.

Additionally, in the first embodiment, the control circuit 152 controls the selector circuit 154 to switch from the header cache memory 161 to the system clock counter 156 at an appropriate timing in order to insert a system clock signal into an appropriate position a of a system stream. However, for example, an exclusive switching control circuit may alternatively be connected to the output terminal of the header cache memory 161 to detect the right position of the system header for inserting a system clock signal thereinto and control the selector circuit 154.

In FIG. 9, which illustrates a second embodiment of the encoder unit according to the present invention, the multiplexer 15' of FIG. 7 is further modified into a multiplexer 15". In the multiplexer 15" of FIG. 9, a selector 162 controlled by the control circuit 152, a single internal buffer 163, a system clock insertion circuit 164 are provided instead of the cache memories 159, 160 and 161 of FIG. 7.

Also, the system header and various headers for audio and video packets are stored in the external memory 18.

The internal buffer 163 is connected via the selector circuit 162 to the internal bus 157 to which the external memory 18 is connected and to the padding output circuit 155. The internal buffer 163 is also connected to the selector circuit 154 and the system clock insertion circuit 164. The system clock insertion circuit 164 is connected to the control circuit 152 and the address generation circuit 153, and is also connected to the selector circuit 154.

The internal buffer 163 includes a system stream buffer (FIFO) 1631, a write address register 1632 and a read address register 1633. The address registers 1632 and 1633 are connected to the system stream buffer 1631. Note that the contents of the address registers 1632 and 1633 are renewed by the control circuit 152.

The write address register 1632 temporarily stores a write address for writing data in the system stream buffer 1631, whereas the read address register 1633 temporarily stores a read address for reading data from the system stream buffer 1631.

The system stream buffer 1631 temporarily stores the various headers and streams sequentially fetched from the external memory 18 in order that they are multiplexed to a single system stream so that a system stream generating means is logically realized there.

Figure 10:
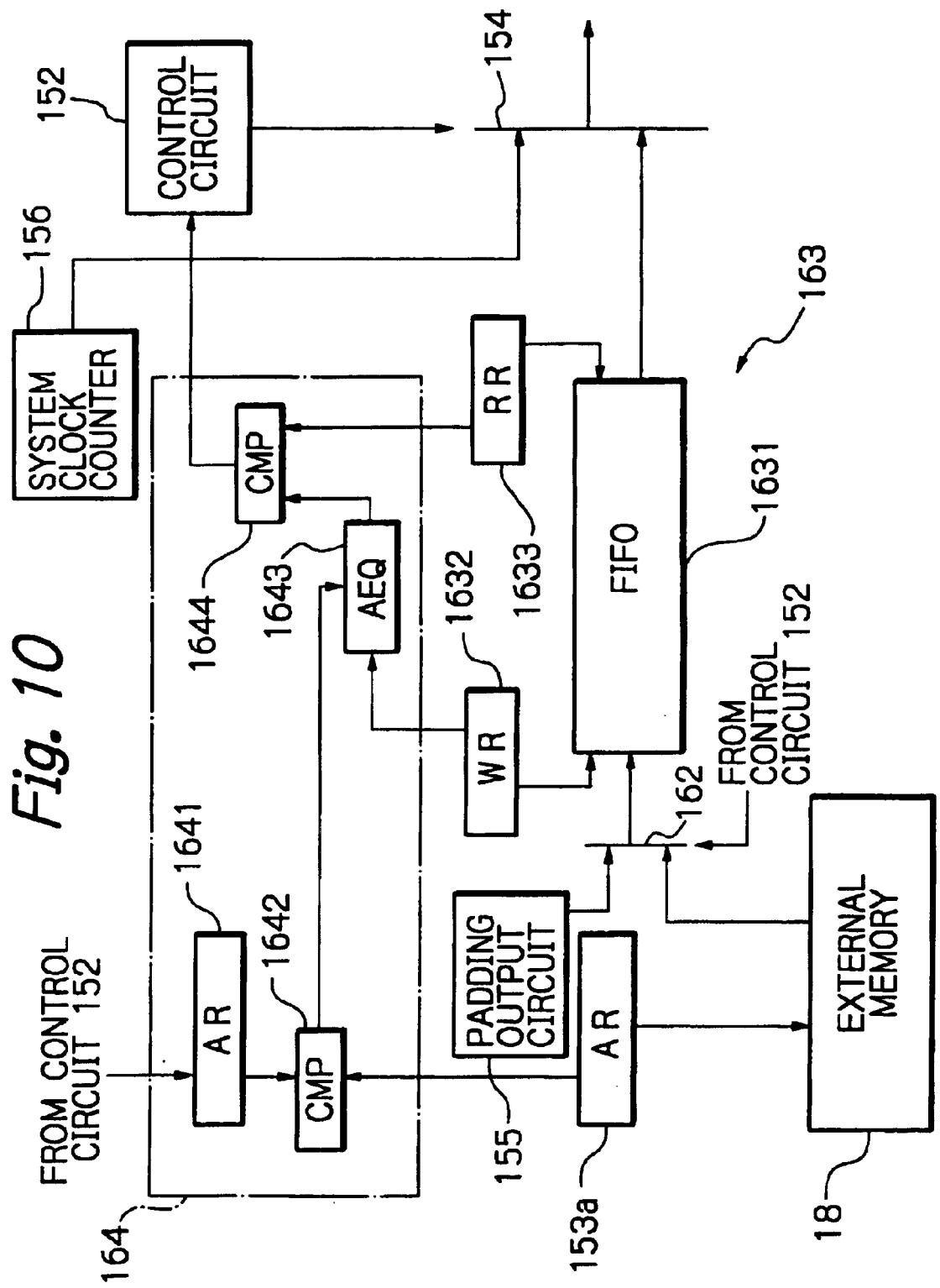
FIG. 10 is a detailed block circuit diagram of the system clock insertion circuit and its periphery of FIG. 9.

In FIG. 10, which is a detailed circuit diagram of the system clock insertion circuit 164 and its periphery of FIG. 9, an address register 153a of the address generation circuit 153 is connected to the system clock insertion circuit 164. The address register 153a temporarily stores address data to be used for reading various headers and streams from the external memory 18. thus, a system header, a plurality of different kinds of transfer data are sequentially read from the external memory 18, on a time division basis corresponding to the address data temporarily stored in the address register 153a so that a data input means is logically realized there.

The system clock insertion circuit 164 is formed by an address register 1641 and a comparator 1642 connected to the address registers 153a and 1641.

The address register 1641 is adapted to temporarily store the address data of the external memory 18 for addressing the position of the system header stored in the external memory 18 when a system clock signal is to be inserted. The content of the address register 1641 is determined in advance by the control circuit 152 when processing a system header read command. The comparator 1642 compares the address data temporarily stored in the address register 153a with the address stored in the address register 1641.

The system clock insertion circuit 164 is further formed by an address acquisition circuit 1643 and a comparator 1644. The address acquisition circuit 1643 is connected to the write address register 1632 of the internal buffer 163 and the comparator 1642. The address acquisition circuit 1643 and the read address register. 1633 of the internal buffer 163 are connected to the comparator 1644, which is connected via the control circuit 152 to the selector circuit 154.

When the result of a comparison made by the comparator 1642 indicates a coincidence that shows the system header is just being read from the external memory 18, the address acquisition circuit 1643 acquires and temporarily stores address data from the write address register 1632 as address data to be used for the system stream buffer 1631 to temporarily store the system header.

The comparator 1644 compares the address data of the address acquisition circuit 1643 with the address data of the address register 1633. If the result of the comparison indicates a coincidence, the selector circuit 154 switches the destination of output data from the system stream buffer 1631 to the system clock counter 156. Since the selector circuit 154 normally selects the system stream buffer 1631 as origination of output data and externally outputs a system stream, a data output means is logically realized there. Thus, when the result of the comparison of the comparator 1644 indicates a coincidence as described above, it switches the origination for sending data to the system clock counter 156 and inputs a system clock signal showing the current time to a predetermined position of the system header of the system stream so that a clock input means is logically realized there.

In the second embodiment, the multiplexer 15" can multiplex an audio stream and a video stream into a single system stream in the form of PS or TS, which is then transmitted as data, as in the case of the multiplexer 15' of the first embodiment. However, the multiplexer 15" differs from the multiplexer 15' of the first embodiment in that it does not separately store various headers and streams in separate cache memories but sequentially stores them in the single internal buffer 163 so that the various data are multiplexed to a system stream at this stage of operation.

The CPU 17 operates the same way as shown in FIG. 8 except that it writes various headers to the external memory 18 and checks the volume of the audio stream in the audio stream area 181 and the volume of the video stream in the video stream area 182 in the external memory 18 when it determines whether or not to generate audio packets or video packets respectively.

Then, as the various data temporarily stored in the internal buffer 163 are externally output from the selector circuit 154 as a system stream, the origination for sending data from the selector circuit 154 is switched to the system clock counter 156 at an appropriate timing in order to insert a system clock signal showing the current time into a predetermined position of the system header of the system stream.

Figure 11:
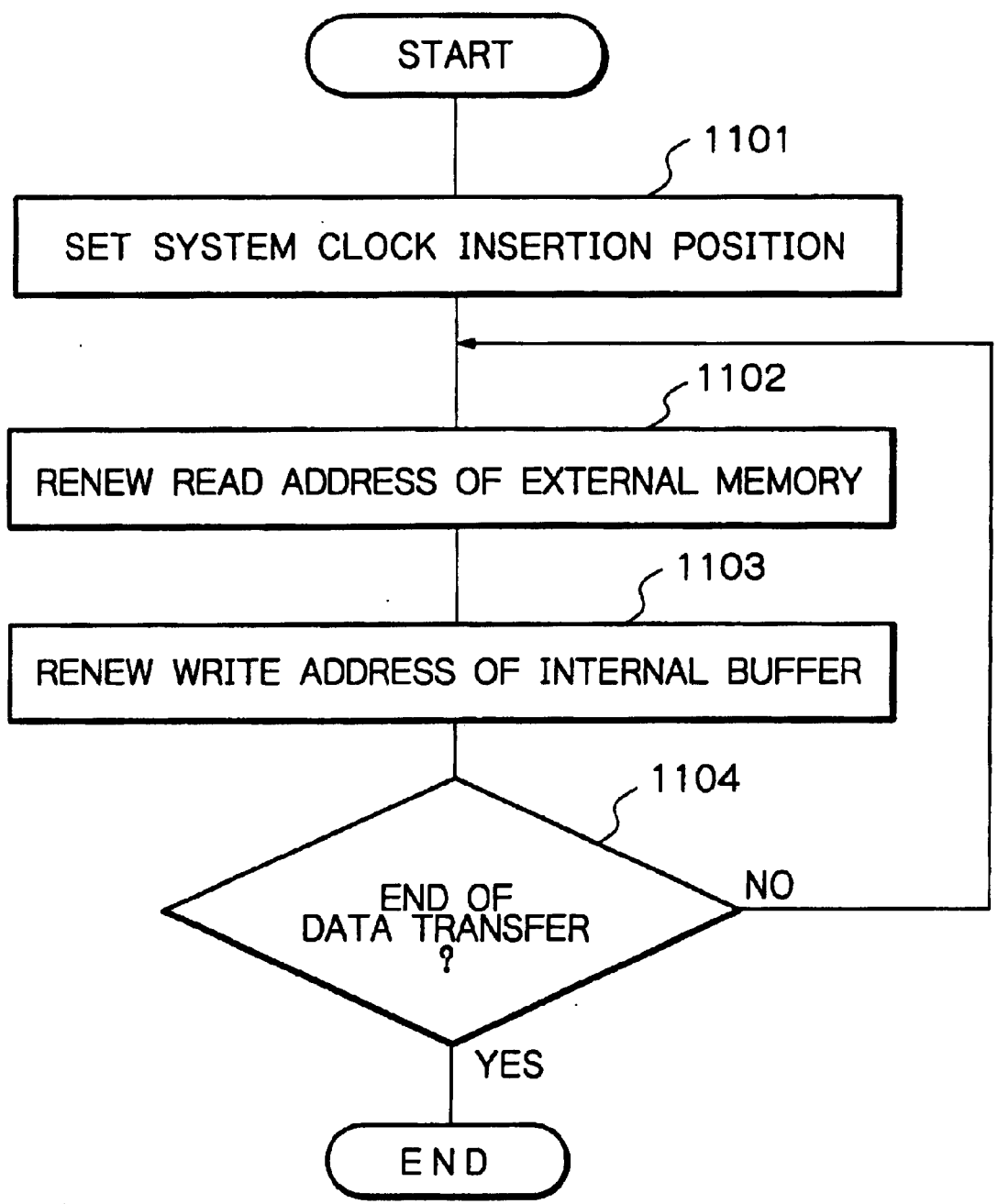
FIG. 11 is a flowchart showing the data transfer operation of the control circuit of FIG. 9.

More specifically, the control circuit 152 sequentially reads the various commands stored in the command FIFO memory 151 by the CPU 17 and controls the address generation circuit 153 by way of the bus arbitration circuit 158, thus carrying out a data transfer operation from the external memory 18 to the internal buffer 163 as shown in FIG. 11.

First, at step 1101, in response to the system header read command, the control circuit 152 generates an address data for the predetermined position of the system header where a system clock signal is to be inserted and writes the address data in the address register 1641 of the clock insertion circuit 164.

If the CPU 17 knows the address of the external memory 18 where the system header is stored, the predetermined position is recognizable by the CPU 17. Otherwise, the address generation circuit 153 can set the predetermined position when it stores the system header generated by the CPU 17.

Next, al step 1102, the control circuit 152 operates the address generation circuit 153 by way of the bus arbitration circuit 158. As a result, the address generation circuit 153 generates address data for reading various data from the external memory 18 and writes it in the address register 153a, so that various headers and audio and video streams are read respectively from the three areas 181, 182 and 183 of the external memory 18 an a time division basis in response to the temporarily stored address data in the address register 153a.

Next, at step 1103, the control circuit 152 renews the address data in the write address register 1632. As a result, the various data sequentially read from the external memory 18 pointed by the address data temporarily stored in the address register 153a are sequentially written into the system stream buffer 1631 of the internal buffer 163 pointed by the address data temporarily stored in the write address register 1632.

Steps 1102 and 1103 are repeated by step 1104 until the data transfer is completed.

As explained above, as the address data of the address register 153a is renewed by step 1102, the address data of the address register 153a is compared by the comparator 1642 with that of the address register 1641. As a result, if they are found to coincide with each other, the address data in the write address register 1632 is temporarily written into the address acquisition circuit 1643. In other words, as read data hits the position where a system clock signal is to be inserted to the system header being read from the external memory 18, the corresponding write address data of the system stream buffer 1631 is written into the address acquisition circuit 1643.

Figure 12:
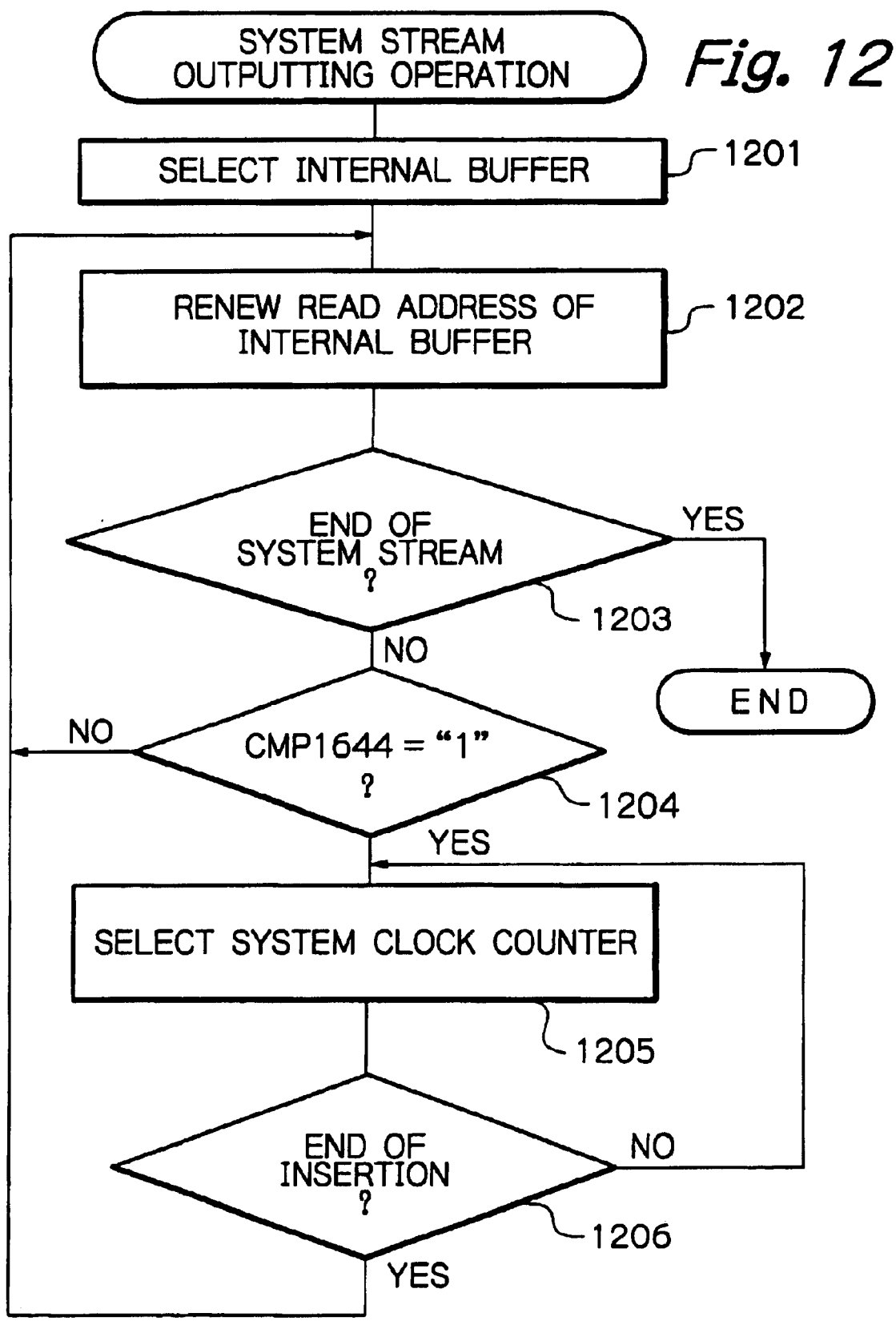
FIG. 12 is a flowchart showing the system stream outputting operation of the control circuit of FIG. 9.

The system stream outputting operation by the control circuit 152 is shown in FIG. 12.

First, at step 1201, the control circuit 152 operates the selector 154 to select the internal buffer Next, at step 1202, the control circuit 152 renews the address data of the read address register 1633. That is, the multiplexed packet written into the system stream buffer 1631 are sequentially read from the system stream buffer 1631 in response to the address data temporarily stored in the read address register 1633 and externally output from the selector circuit 154.

Steps 1201 and 1202 are repeated by step 1203 until an outputting operation is completed. Otherwise, the control proceeds to step 1204.

At step 1204, it is determined whether or not the output signal of the comparator 1644 is "1", i.e., whether or not the address data of the address acquisition circuit 1643 coincides with the read address register 1633. Only when the output signal of the comparator 1644 is "1", does the control proceed to steps 1205 and 1206. otherwise, the control returns to step 1202.

At step 1205, the origination of data sent from the selector circuit 154 is switched from the system stream buffer 1631 to the system clock counter 156. Step 1205 is repeated by step 1206 until an insertion of a system clock signal is completed.

Thus, as multiplexed packets are sequentially read from the system stream buffer 1631 and externally output, where the data of the multiplexed packets indicates a position where a system clock signal is to be inserted into the system header, a system clock signal is externally output from the system clock counter 156.

As described above, the system stream externally output from the encoder unit 1 of FIG. 9 carries a system clock signal showing the current time and inserted into the system header of the system stream, so that the decoder unit 2 of FIG. 1 for externally receiving the system stream can accurately synchronize its own system clock signal and hence decode the audio packets and the video packets at appropriate respective timings.

Like the encoder unit 1 of the first embodiment, the encoder unit 1 of the second embodiment is provided only with a single external memory 18 for temporarily storing the audio stream and the video stream along with the various headers. Thus, only a single interface is required for the multiplexer 15" to access the external memory 18 and hence the multiplexer 15" can be down-sized and manufactured with an improved productivity.

Additionally, since the multiplexer 15" of the second embodiment uses only the single external memory 18 for temporarily storing various data, a data reading operation may have to be held to a stand-by slate for a long period in order to execute a data writing operation. However, with the multiplexer 15" of the second embodiment, the multiplexed packets read from the external memory 18 are temporarily stored in the internal buffer 163 before being externally output in the form of a system stream, so that the risk of delaying the transmission of packets in a system stream behind the due time for decoding and reproducing by the decoder unit and the risk of frequently outputting padding packets can be reduced to ensure an overall excellent transfer rate.

Particularly, the multiplexer 15" of the second embodiment is adapted to multiplex various headers and audio and video streams before temporarily storing them in the single internal buffer 163 and hence there is no need of preparing a plurality of cache memories for temporarily storing different kinds of data. Thus, it is sufficient for such an internal buffer to have a minimum memory capacity required for continuously forming system streams. Such an internal buffer is normally required to have a memory capacity for storing at least a single packet.

Thus, while the multiplexer 15" of the second embodiment needs to have an additional single internal buffer if compared with the prior art multiplexer 15 of FIG. 2, the increase in the circuit size attributable to it is quite small and the overall size of the apparatus can be remarkably reduced because the encoder unit includes only a single interface to reduce the number of wires and connectors.

Additionally, the multiplexer 15' of the second embodiment is so arranged that, as various data are transferred from the external memory 18 to the internal buffer 163, the write address of the internal buffer 163 is temporarily stored only when the read address of the external memory 18 coincides with the insertion address of the system clock signal and, as multiplexed packets stored in the internal buffer 163 are externally output from the selector circuit 154, a system clock signal of the system clock counter 156 is externally output from the selector circuit 154 only when the read address coincides with the temporarily stored write address.

Thus, a system clock signal can be inserted into the right position of the system stream that is produced by multiplexing various data and externally output after having been temporarily stored in the internal buffer 163.

This processing operation can be performed reliably in a simple manner by comparing address data by means of hardware.

Figure 13:
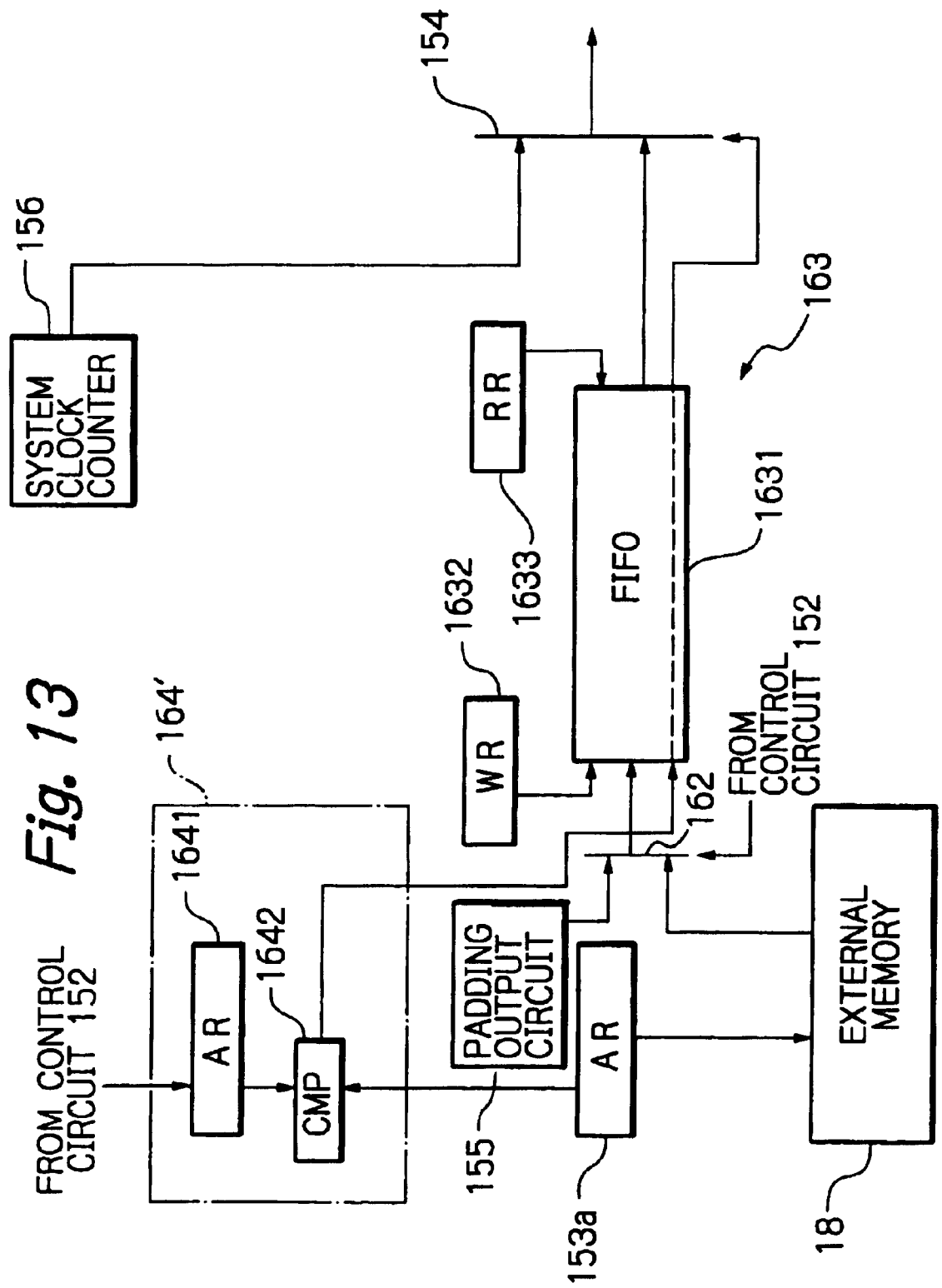
FIG. 13 is a block circuit diagram illustrating a modification of the circuit of FIG. 10.

The present invention is not limited to the above-described second embodiment, which can be altered and modified in various ways without departing from the spirit and the scope of the invention. For example, as illustrated in FIG. 13, it is possible to connect the comparator 1642 to an additional input terminal of the system stream buffer 1631, and an additional output terminal of the system stream buffer 1631 is connected to the control terminal of the selector circuit 154. In FIG. 13, the system clock insertion circuit 164 is modified into a system clock insertion circuit 164' where the address acquisition circuit 1643 and the comparator 1644 of FIG. 10 are omitted.

With the arrangement of FIG. 13, when the operation of transferring various data from the external memory 18 to the internal buffer 163 hits the right position of the system header for inserting a system clock signal, an identification data obtained as a result of the comparison by the comparator 1642 is written into the system stream buffer 1631. When a system stream is externally output from the internal buffer 163, the selector circuit 154 is controlled by the identification data simultaneously output from the internal buffer 163 to select the system clock counter 156.

In FIG. 13, since the address acquisition circuit 1643 and the comparator 1644 of FIG. 10 can be omitted, the multiplexer can be further down-sized and manufactured with an improved productivity. However, the volume of data to be used will be increased because the identification data leas to be inserted into the system stream buffer 163. Thus, the second embodiment and its modification embodiment have their respective advantages and disadvantages, so that it is recommended to select either of them for use depending on the application.

As explained hereinabove, according to the present invention, different kinds of data can be smoothly and externally output for transfer in the form of a system stream by using only a single external memory.

What is claimed is:

1. A data multiplexing apparatus comprising:
   a single memory for storing an audio stream and a video stream; and
   a multiplexer comprising:
      an internal bus connected to said single memory;
      a header cache memory for storing a system header, an audio header, and a video header;
      an audio stream cache memory, connected to said internal bus, for storing said audio stream;
      a video stream cache memory, connected to said internal bus, for storing said video stream;
      an address generation circuit, connected to said single memory by said internal bus, for fetching said audio stream and said video stream from said single memory on a time division basis, so that said audio stream and said video stream are stored via said internal bus in said audio stream cache memory and said video stream cache memory, respectively;
      a bus arbitration circuit, connected to said address generation circuit, for controlling said address generation circuit and arbitrating access to said internal bus;
      a system clock counter for generating a system clock signal indicating a current time;
      a selector circuit, connected to said header cache memory, said audio stream cache memory, said video stream cache memory, and said system clock counter, for sequentially selecting said header cache memory, said audio stream cache memory, and said video stream cache memory and outputting a system stream comprising said system header, said audio header, said audio stream, said video header, and said video stream, respectively; and
      a control circuit, connected to said bus arbitration circuit and said selector circuit, for controlling said selector circuit to select said system clock counter to input said system clock signal to a predetermined position of said system header,
         wherein said single memory is external to said multiplexer.

2. The apparatus as set forth in claim 1, wherein
   said header cache memory has a capacity for storing at least one of said system header, said audio header, and said video header,
   said audio stream cache memory has a capacity for storing at least one packet of said audio stream, and
   said video stream cache memory has a capacity for storing at least one packet of said video stream.

3. A data multiplexing apparatus comprising:
   a single memory for storing a system header, an audio header, a video header, an audio stream, and a video stream; and
   a multiplexer comprising:
      an internal bus connected to single memory;
      an address generation circuit, connected to said single memory by said internal bus, for generating a first address of said single memory to read on a time division basis and to multiplex via said internal bus said system header, said audio header, said audio stream, said video header, and said video stream, to produce a system stream;
      an internal buffer for storing said system stream;
      a bus arbitration circuit, connected to said address generation circuit, for controlling said address generation circuit and arbitrating access to said internal bus;
      a system clock counter for generating a system clock signal indicating a current time;
      a system clock insertion circuit, connected to said address generation circuit and said internal buffer, for generating a timing signal for inserting said system clock signal into said system header of said system stream;
      a selector circuit connected to said internal buffer and said system clock counter, for inputting data from said internal buffer and said system clock and outputting a system stream formed by said data from said internal buffer and said system clock; and
      a control circuit, connected to said bus arbitration circuit, said system clock insertion circuit, and said selector circuit, for controlling said selector circuit to select said internal buffer when said system clock insertion circuit does not generate said timing signal and to select said system clock counter when said system clock insertion circuit generates said timing signal,
         wherein said single memory is external to said multiplexer.

4. The apparatus as set forth in claim 3, wherein
said internal buffer comprises:
   a system stream first-in first-out memory;
   a write address register, connected to said system stream first-in first-out memory, for generating a write address for writing data into said system stream first-in first-out memory; and
   a read address register, connected to said system stream first-in first-out memory, for generating a read address for reading data from said system stream first-in first-out memory, and
said system clock insertion circuit comprises:
   an address register for storing a second address of said single memory indicating a position of said system header;
   a first comparator, connected to said address generation circuit and said address register, for comparing said first address with said second address;
   an address acquisition circuit, connected to said write address register and said first comparator, for storing said write address when said first address coincides with said second address; and
   a second comparator, connected to said read address register and said address acquisition circuit, for comparing said read address with said write address stored in said address acquisition circuit to generate said timing signal when said read address coincides with said write address stored in said address acquisition circuit.

5. The apparatus as set forth in claim 3, wherein said system header, said audio header, said audio stream, said video header, and said video stream are sequentially stored in said internal buffer.

6. A data multiplexing apparatus comprising:
   a single memory for storing a system header, an audio header, and a video header, an audio stream and a video stream; and a multiplexer comprising:
an internal bus connected to said single memory;
an address generation circuit, connected to said single memory by said internal bus, for generating a first address of said single memory to read on a time division basis and to multiplex via said internal bus said system header, said audio header, said audio stream, said video header, and said video stream, respectively, to produce a system stream;
an internal buffer for storing said system stream;
a bus arbitration circuit, connected to said address generation circuit, for controlling said address generation circuit and arbitrating access to said internal bus;
a system clock counter for generating a system clock signal indicating a current time;
a system clock insertion circuit connected to said address generation circuit for inserting said system clock signal into said system header;
an address register for storing a second address of said single memory indicating a special position of said system header;
a comparator, connected to said address generation circuit and said address register, for comparing said first address with said second address and generating identification data when said first address coincides with said second address, said comparator being connected to said internal buffer so that said identification data is written into said internal buffer;
a selector circuit, connected to said internal buffer and said system clock counter for inputting data from said internal buffer and said system clock and outputting a system stream comprising said data from said internal buffer and said system clock; and
a control circuit, connected to said bus arbitration circuit, said system clock insertion circuit, and said selector circuit, for controlling said selector circuit to select said internal buffer when said internal system stream storing circuit does not generate said identification data and to select said system clock counter when said system stream storing circuit generates said identification data,
wherein said single memory is external to said multiplexer.

7. The apparatus as set forth in claim 6, wherein said system header, said audio header, said audio stream, said video header, and said video stream are sequentially stored in said internal buffer.

8. A data multiplexing method comprising:
sequentially fetching via an internal bus on a time division basis an audio stream and a video stream, which are stored in a single memory that is external to a multiplexer;
temporarily and individually storing via said internal bus said audio stream and said video stream sequentially fetched from said single memory in internal audio and video cache memories, respectively;
temporarily storing via said internal bus a system header, an audio header, and a video header in an internal header cache memory;
reading sequentially each of said system header, said audio header, said audio stream, said video header, and said video stream that have been temporarily stored and multiplexing them into a single system stream;
inputting as data a system clock signal indicating a current time to a predetermined position of said system header of said single system stream including said system clock signal input; and
externally outputting said single system stream.

9. A data multiplexing method comprising:
sequentially fetching via an internal bus on a time division basis a system header, an audio header, an audio stream, a video header, and a video stream externally input to and stored in a single memory that is external to a multiplexer;
multiplexing via said internal bus said system header, said audio header, said audio stream, said video header, and said video stream sequentially fetched from said single memory into a single system stream;
temporarily storing said single system stream;
reading said temporarily stored single system stream and inputting as data a system clock signal indicating a current time into a predetermined position of said system header; and
externally outputting said single system stream including said system clock signal.

10. A data multiplexing apparatus, comprising:
a single memory for storing an audio stream and a video stream; and
a multiplexer comprising:
an internal header cache memory for storing a system header, an audio header, and a video header;
an internal audio stream cache memory for storing said audio stream;
an internal video stream cache memory for storing said video stream;
a system clock counter that provides a system clock signal, which indicates a current time; and
a selector circuit that inputs data via an internal bus from said internal header cache memory, said internal audio stream cache memory, said internal video stream cache memory, and said system clock counter, and that time division multiplexes said system header, said audio header, said audio stream, said video header, and said video stream to output a system stream, which is output to an external communication network,
wherein said system header includes said system clock signal, which is inserted at a predetermined time, and said single memory is external to said multiplexer.

11. The apparatus as set forth in claim 10, further comprising an internal bus, said internal bus being connected to said single memory, which is connected in parallel by said internal bus to said internal header cache memory, said internal audio stream cache memory, and said video stream cache memory.

12. The apparatus as set forth in claim 10, further comprising an address generating circuit, connected to said single memory, that generates addresses for reading said audio stream and said video stream from said single memory on a time division basis.

13. The apparatus as set forth in claim 12, further comprising a bus arbitration circuit that is connected to a control circuit, said address generating circuit, an audio encoder, a video encoder, and a central processing unit (CPU), wherein said bus arbitration circuit arbitrates access to said internal bus by said control circuit, said address generating circuit, said audio encoder, said video encoder, and said CPU.

14. A data multiplexing apparatus, comprising:
a single memory for storing a system header, an audio header, an audio stream, a video header, and a video stream; and a multiplexer comprising:
   an address generating circuit that generates a plurality of addresses to sequentially read via an internal bus from said single memory on a time division basis to temporarily store in an internal system stream buffer via said internal bus, said system header, said audio header, said audio stream, said video header, and said video stream;
   a system clock insertion circuit that generates a system clock signal, which is inserted into said system header at a predetermined position; and
   a selector circuit that inputs said system header, said audio header, said audio stream, said video header, and said video stream and outputs said system header, said audio header, said audio stream, said video header, and said video stream as a multiplexed system stream to an external communication network,
      wherein said selector circuit selects said internal system stream buffer, when said system clock insertion circuit does not generate said system clock signal, and selects said system clock counter, when said system clock insertion circuit generates said system clock signal, and said single memory is external to said multiplexer.

15. The apparatus as set forth in claim 14, wherein said system clock insertion circuit comprises:
   an address register for storing a clock signal insertion address that corresponds to said predetermined position of said system header, where said system clock signal is to be inserted;
   a first comparator, connected to said address generating circuit and said address register, for comparing said plurality of addresses with said clock signal insertion address;
   an address acquisition circuit, connected to a write address register and said first comparator, for storing a write address when one of said plurality of addresses coincides with said clock signal insertion address; and
   a second comparator, connected to a read address register and said address acquisition circuit, for comparing a read address with said write address stored in said address acquisition circuit and generating said system clock signal when said read address coincides with said write address stored in said address acquisition circuit.

16. The apparatus as set forth in claim 14, wherein said internal system stream buffer is connected via a selector to an internal bus, to which said single memory is connected, and to a padding output circuit.

17. A data multiplexing method, comprising:
   sequentially fetching via an internal bus from a single memory, which is external to a multiplexer, on a time division basis, an audio stream and a video stream;
   storing a system header, an audio header, and a video header in an internal header cache memory via said internal bus;
   storing said audio stream and said video stream in an audio stream cache memory and a video stream cache memory, respectively;
   sequentially reading via said internal bus on a time division basis said system header, said audio header, said audio stream, said video header, and said video stream, which are stored via said internal bus in said internal header cache memory, said audio stream cache memory, and said video stream cache memory to produce a multiplexed single system stream;
   inputting a system clock signal, indicating a current time, to a predetermined position of said system header of said multiplexed single system stream; and
   outputting said multiplexed single system stream, including said system clock signal, to an external communication network.

18. The data multiplexing method of claim 17, wherein when sequentially reading said system header, a control circuit controls a selector circuit so as to switch an origin of said multiplexed single system stream from said internal header cache memory to a system clock counter, which provides said system clock signal for insertion into said predetermined position of said system header.

19. The data multiplexing method of claim 17, wherein sequentially fetching said audio stream and said video stream, from said single memory to said data multiplexer, is controlled by a control circuit that controls an address generation circuit, which provides addresses corresponding to said audio stream and said video stream in said single memory.

20. A data multiplexing method, comprising:
   multiplexing via an internal bus, on a time division basis, a system header, an audio header, an audio stream, a video header, and a video stream, that are stored in a single memory, which is external to a multiplexer, to an internal system stream buffer;
   identifying a position of said system header into which a system clock signal is to be inserted;
   outputting said audio header, said audio stream, said video header, said video stream, and said system header by a selector circuit as a system stream, such that, when said selector circuit identifies said position of said system header, said system clock signal is inserted into said position of said system header.

21. A data multiplexing method comprising:
   sequentially fetching on a time division basis compressed audio data and compressed video data which are then stored in a single memory external to a multiplexer;
   temporarily and individually storing said compressed audio data and said compressed video data from said single memory in first and second internal memories, respectively;
   temporarily and individually storing a system header, an audio header, and a video header in a third internal memory;
   reading sequentially said system header, said audio header, said compressed audio data, said video header, and said compressed video data from said first, second, and third internal memories and multiplexing them into a single system stream while inputting as data a system clock signal indicating a current time to a predetermined portion of said system header; and
   externally outputting said single system stream.

22. A data multiplexing apparatus comprising;
   a unit for sequentially fetching on a time division basis compressed audio data and compressed video data which are then stored in a single memory external to a multiplexer;
   a unit for temporarily and individually storing said compressed audio data and said compressed video data from said single memory in first and second internal memories, respectively;
   a unit for temporarily and individually storing a system header, an audio header, and a video header in a third internal memory;
   a unit for reading sequentially said system header, said audio header, said compressed audio data, said video header, and said compressed video data from said first, second, and third internal memories and multiplexing them into a single system stream while inputting as data a system clock signal indicating a current time to a predetermined position of said system header; and a unit for externally outputting said single system stream.

23. A data multiplexing method comprising:

sequentially fetching on a time division basis a system header, an audio header, a video header, compressed audio data, and compressed video data which are then stored in a single memory external to a multiplexer;

reading sequentially said system header, said audio header, said compressed audio data, said video header, and said compressed video data from said single memory and multiplexing them into a single system stream;

temporarily storing said single system stream;

reading said temporarily stored single system stream while inputting as data a system clock signal indicating a current time to a predetermined portion of said system header; and externally outputting said single system stream.

24. A data multiplexing apparatus comprising:

a unit for sequentially fetching on a time division basis a system header, an audio header, a video header, compressed audio data, and compressed video data which are then stored in a single memory external to a multiplexer;

a unit for reading sequentially said system header, said audio header, said compressed audio data, said video header, and said compressed video data from said single memory and multiplexing them into a single system stream;

a unit for temporarily storing said single system stream;

a unit for reading said temporarily stored single system stream while inputting as data a system clock signal indicating a current time to a predetermined portion of said system header; and a unit for externally outputting said single system stream.

\* \* \* \* \*